(12) United States Patent
Tate, Jr.

(10) Patent No.: US 10,354,026 B2
(45) Date of Patent: Jul. 16, 2019

(54) SYSTEM AND METHOD FOR THE GENERATION AND USE OF AN ELECTRO-THERMAL BATTERY MODEL

(71) Applicant: Dassault Systemes Simulia Corp., Johnston, RI (US)

(72) Inventor: Edward Dean Tate, Jr., Grand Blanc, MI (US)

(73) Assignee: Dassault Systemes Simulia Corp., Johnston, RI (US)

(*) Notice: Subject to any disclaimer, the term of this patent is extended or adjusted under 35 U.S.C. 154(b) by 528 days.

(21) Appl. No.: 15/044,454

(22) Filed: Feb. 16, 2016

(65) Prior Publication Data

US 2017/0235858 A1 Aug. 17, 2017

(51) Int. Cl.
*G06F 7/60* (2006.01)
*G06F 17/10* (2006.01)
(Continued)

(52) U.S. Cl.
CPC .......... *G06F 17/5009* (2013.01); *G06F 17/11* (2013.01); *G06F 17/5036* (2013.01); *G06F 2217/16* (2013.01); *G06F 2217/78* (2013.01)

(58) Field of Classification Search
None
See application file for complete search history.

(56) References Cited

U.S. PATENT DOCUMENTS

2010/0045240 A1 2/2010 Johannes et al.
2013/0091950 A1 4/2013 Bernard
(Continued)

FOREIGN PATENT DOCUMENTS

EP 0987555 3/2000
EP 2899558 7/2015
WO WO 2001/15023 3/2001
(Continued)

OTHER PUBLICATIONS

Lam, Long et al., "A Practical Circuit Based-Model for Li-ion Battery Cells in Electric Vehicle Applications", 2011, IEEE. (Year: 2011).*

(Continued)

*Primary Examiner* — Cedric Johnson
(74) *Attorney, Agent, or Firm* — Fish & Richardson P.C.

(57) ABSTRACT

Methods, systems, and apparatus, including computer programs encoded on computer storage media, for the generation and use of an electro-thermal battery model. One of the methods includes obtaining battery data comprising voltage values, with each voltage value corresponding to an operating state of the battery. The method includes selecting a battery model, the battery model having convex parameters and non-convex parameters. The method includes processing the battery data by performing a fitting procedure to determine values of the convex parameters and non-convex parameters. The fitting procedure includes fitting the convex parameters with respect to the battery data during which the non-convex parameters are held fixed. The fitting procedure includes fitting the non-convex parameters with respect to the battery data. The fitting procedure also includes creating an electro-thermal model for a battery from the selected battery model using the fitted values of the convex and non-convex parameters.

22 Claims, 7 Drawing Sheets

(51) Int. Cl.
*G06F 17/50* (2006.01)
*G06F 17/11* (2006.01)

(56) References Cited

U.S. PATENT DOCUMENTS

| | | |
|---|---|---|
| 2014/0244225 A1 | 8/2014 | Balasingam et al. |
| 2014/0350875 A1 | 11/2014 | Mullen et al. |
| 2015/0147608 A1 | 5/2015 | Lin et al. |

FOREIGN PATENT DOCUMENTS

| | | | |
|---|---|---|---|
| WO | WO 2013/016188 | 1/2013 | |
| WO | WO-2013016188 A1 * | 1/2013 | ......... G01R 31/3651 |
| WO | WO 2015/042654 | 4/2015 | |

OTHER PUBLICATIONS

Giegerich, M. et al., "Electrothermal Modeling and Characterization of High Capacity Lithium-Ion Battery Systems for Mobile and Stationary Applications", 2013, IEEE. (Year: 2013).*

Ecker, Madeleine et al., "Development of a Lifetime Prediction Model for Lithium-Ion Batteries Based on Extended Accelerated Aging Test Data", 2012, Journal of Power Sources, 215, Elsevier, B.V. (Year: 2012).*

Hicks, Jared et al., "Ultracapacitor Energy Management and Controller Developments for a Series-Parallel 2-by-2 Hybrid Electric Vehicle", 2007, IEEE. (Year: 2007).*

Mercati, Pierto et al., "User-centric Joint Power and Thermal Management for Smartphones", 2014, 6th International Conference on Mobile Computing, Applications and Services (MobiCASE), ICST. (Year: 2014).*

Benner, Peter et al., "Model Order Reduction for Coupled Problems", 2015, Appl. Comput. Math, vol. 14, No. 1. (Year: 2015).*

Lee, J-K et al., "Mechanical Durability and Electrical Durability of an Aluminum-Laminated Lithium-Ion Polymer Battery Pack for a Hybrid Electric Vehicle", Feb. 18, 2010, Proc. IMechE vol. 224, Part D: J. Automobile Engineering. (Year: 2010).*

Altaf, Faisal et al., "Evaluating the Potential for Cell Balancing Using a Cascaded Multi-Level Converter Using Convex Optimization", Oct. 23-25, 2012, Workshop on Engine and Powertrain Control, Simulation and Modeling, IFAC. (Year: 2012).*

International Search Report and Written Opinion; PCT/US2017/016887; dated Apr. 14, 2017; 13 pages.

EP Extended European Search Report in EP App. 17753651.3, dated Jan. 22, 2019.

* cited by examiner

SYSTEM AND METHOD FOR THE GENERATION AND USE OF AN ELECTRO-THERMAL BATTERY MODEL

BACKGROUND

An electric battery is a device consisting of two or more electrochemical cells that convert stored chemical energy into electrical energy. Each cell has a positive terminal, or cathode, and a negative terminal, or anode. The terminal marked positive is at a higher electrical potential energy than is the terminal marked negative. The terminal marked negative is the source of electrons that when connected to an external circuit will flow and deliver energy to an external device. When a battery is connected to an external circuit, electrolytes are able to move as ions within, allowing the chemical reactions to be completed at the separate terminals and so deliver energy to the external circuit. The process of converting chemical energy to electrical energy involves losses which are converted to heat.

SUMMARY

This specification describes technologies relating to individual cells and batteries.

In general, one innovative aspect of the subject matter described in this specification can be embodied in methods that include, in aspect 1, the actions of obtaining battery data comprising voltage values, with each voltage value corresponding to an operating state of the battery. The method includes the actions of selecting a battery model, the battery model having convex parameters and non-convex parameters. The method includes the actions of processing the battery data by performing a fitting procedure to determine values of the convex parameters and non-convex parameters. The fitting procedure includes fitting the convex parameters with respect to the battery data during which the non-convex parameters are held fixed. The fitting procedure includes fitting the non-convex parameters with respect to the battery data. The fitting procedure also includes creating an electro-thermal model for a battery from the selected battery model using the fitted values of the convex and non-convex parameters.

The foregoing and other embodiments can each optionally include one or more of the following features, alone or in combination.

An aspect 2 according to any combination of aspects 1, and 3-20, wherein the fitting of the non-convex parameters triggers fitting of the convex parameters.

An aspect 3 according to any combination of aspects 1-2, and 4-20, wherein the fitting procedure is configured to continue fitting the non-convex parameters until values of a cost function satisfies a predefined threshold.

An aspect 4 according to any combination of aspects 1-3, and 5-20, wherein the fitting procedure comprises a nested loop procedure in which the convex parameters are fit with respect to the battery data using an inner loop during which the non-convex parameters are held fixed, and the non-convex parameters are fit with respect to the battery data using an outer loop.

An aspect 5 according to any combination of aspects 1-4, and 6-20, wherein the battery model includes an electrical model and a thermal model, the electrical model configured to predict battery voltage and heat generation, and thermal model being configured to predict temperature based on the heat generation and the difference between predicted temperature and measured temperature is used in the fitting procedure.

An aspect 6, according to any combination of aspects 1-5, and 6-20 wherein the battery model uses basis vector functions to represent the at least one convex parameter over a range of battery states and the battery state include some set of battery temperature, state of charge, and age.

An aspect 7 according to any combination of aspects 1-6, and 8-20, wherein difference between the predicted temperature and the temperature data is included in the cost function used in the fitting procedure.

An aspect 8 according to any combination of aspects 1-7, and 9-20, wherein the battery data is collected from multiple, different batteries.

An aspect 9 according to any combination of aspects 1-8, and 10-20, where the battery data is collected from a plurality of thermal environments.

An aspect 10 according to any combination of aspects 1-10, and 11-20, wherein the battery data is collected from multiple measurement systems.

An aspect 11 according to any combination of aspects 1-11, and 12-20, further comprising encoding the electro-thermal model in electronics to monitor battery performance in an automobile.

An aspect 12 according to any combination of aspects 1-11, and 13-20, further including encoding the electro-thermal model in electronics to monitor battery performance in a mobile electronic device.

An aspect 13 according to any combination of aspects 1-12, and 14-20, further comprising a simulation system configured to execute a numerical simulation of a battery.

An aspect 14 according to any combination of aspects 1-13, and 15-20, wherein selecting the battery model comprises comparing a plurality of battery models and selecting the battery model having the lowest cost function.

An aspect 15 according to any combination of aspects 1-14, and 16-20, wherein the at least one convex parameter is selected based on a convex cost function.

An aspect 16 according to any combination of aspects 1-15, and 17-20, wherein selecting the battery model comprises comparing the number of non-convex parameters to a threshold.

An aspect 17 according to any combination of aspects 1-16, and 18-20, wherein selecting the battery model includes determining a ratio between the non-convex parameters and the convex parameters, and comparing the ratio to a threshold.

An aspect 18 according to any combination of aspects 1-17, and 19-20, wherein the electro-thermal model is predictive over a continuous range of battery operating states which compromises a subset of the conditions experienced by the battery or all design conditions the battery will experience.

An aspect 19 according to any combination of aspects 1-18, and 20, wherein the fitting enables efficient processor use by selecting the non-convex parameters prior to selecting the convex parameters.

An aspect 20 according to any combination of aspects 1-19, wherein the operating state of the battery comprises at least one of temperature, electrical current, and state of charge.

Particular embodiments of the subject matter described in this specification can be implemented so as to realize one or more of the following advantages. Electro-thermal models for batteries can be efficiently produced. Batteries may be monitored and controlled using electronics using less processing power than required to manage and compute more complex equations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A battery is an electro-thermal system. It is primarily used to store electrical energy. Its efficiency and electrical behavior are closely tied to the temperature of the elements in a battery. A low order electrical model can be used to predict and control the electrical behavior of a battery. For example, a low order model can be used to identify a range of charge and discharge power over which the battery can be used with minimal effect on battery durability. This is done by using predicted voltages and heat generation to identify when excessive temperatures or chemical concentrations occur.

Figure 1:
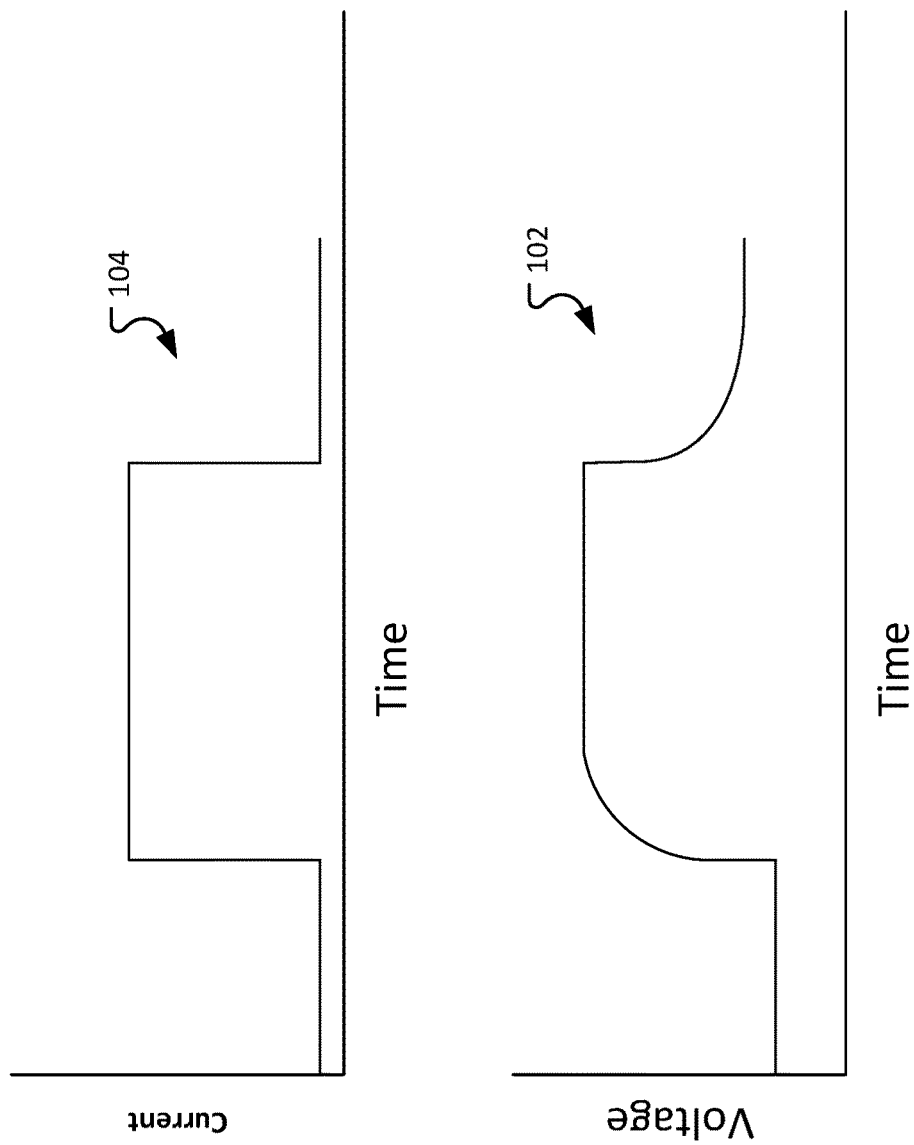
FIG. 1 illustrates a typical voltage response of a battery to a current pulse.

The electrical and thermal conditions on its boundaries interact. Furthermore, the response of a battery to a change on its boundaries is a function of previous changes at the boundaries. For example, under constant thermal conditions, a change in the current at the terminals of a battery results in a response which reflects the current and ionic distribution within the battery and its interactions with the surrounding materials. FIG. 1 illustrates a typical voltage response 102 of a battery to a current pulse 104. Additionally the changes in voltage are correlated with the generation of heat in the battery which leads to changes in the temperature of the battery.

Figure 2:
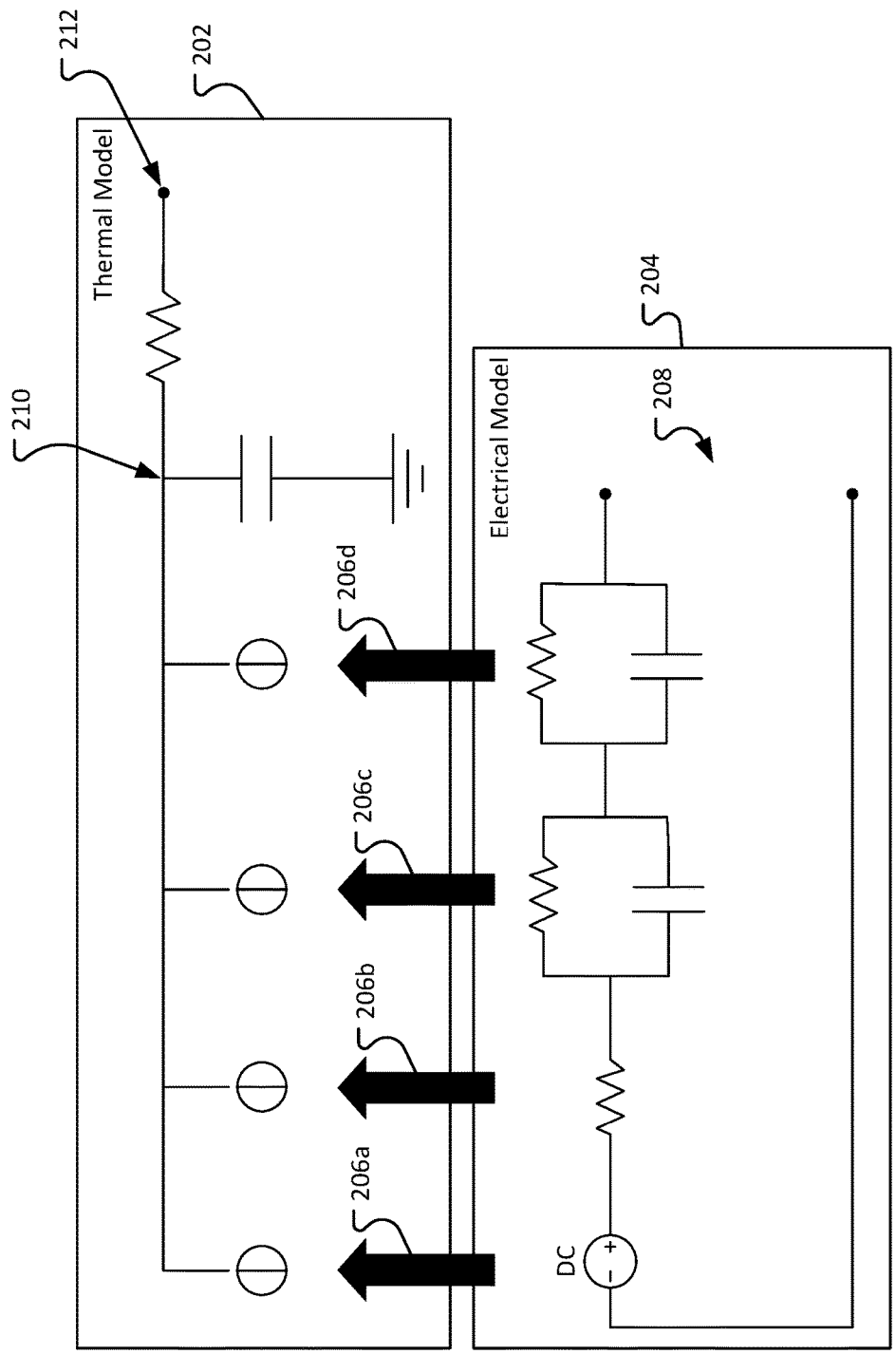
FIG. 2 illustrates an example of a circuit to represent a battery.

This battery electrical behavior can be modeled using different approaches. One approach is based on the use of partial differential equations which describe the electrical and ionic behavior within a cell. The partial differential equation approach models the physics within a cell to predict the electrical behavior. Another approach is to model the observed behavior using equations which mimic that behavior. For example, using an equivalent circuit model as shown in FIG. 2. This explanation will focus on the use of equivalent circuit models. However these approaches apply to systems of equations which cannot be described using electrical circuit models. In all of these techniques, test data is used to tune the model to match experimental results.

For illustration of the system, the circuit shown in FIG. 2 will be used. In this model parameters can be tuned to predict battery voltages given current and voltage information. Additionally, these parameters can vary to represent the changes which are observed with temperature, state of change (SOC) and age.

Conventional techniques estimate electrical parameters given at a single temperate, SOC, and age using only voltage and current measurements. In the system described herein, the electrical parameters are estimated for all temperature, SOC, and age conditions from measurements of voltage, current, and temperatures. A representation of the electrical parameters is used so that modeling error is convex with respect to the majority of the electrical parameters. Additionally, basis functions are used both to ensure convexity and to represent the electrical parameters over a range of temperature, SOC, and age. Further, a thermal model 202 coupled to the losses in the electrical model 204 so that observed temperatures provide additional information for the estimation of electrical parameters.

Referring to FIG. 2, the electrical model allows the terminal voltage 208 across the poles of the battery to be determined. The generation of electrical heat is represented by the arrows 206a-d, indicating the generation of heat in the electrical model 204. The thermal model 202 allows for the temperature of the battery to be determined at point 210, where the external temperature can be determined at point 212. FIG. 2 is an exemplary model. In practice, any system of equations representing the electrical behavior, the thermal behavior, and the coupling between the two may be applied.

Figure 3:
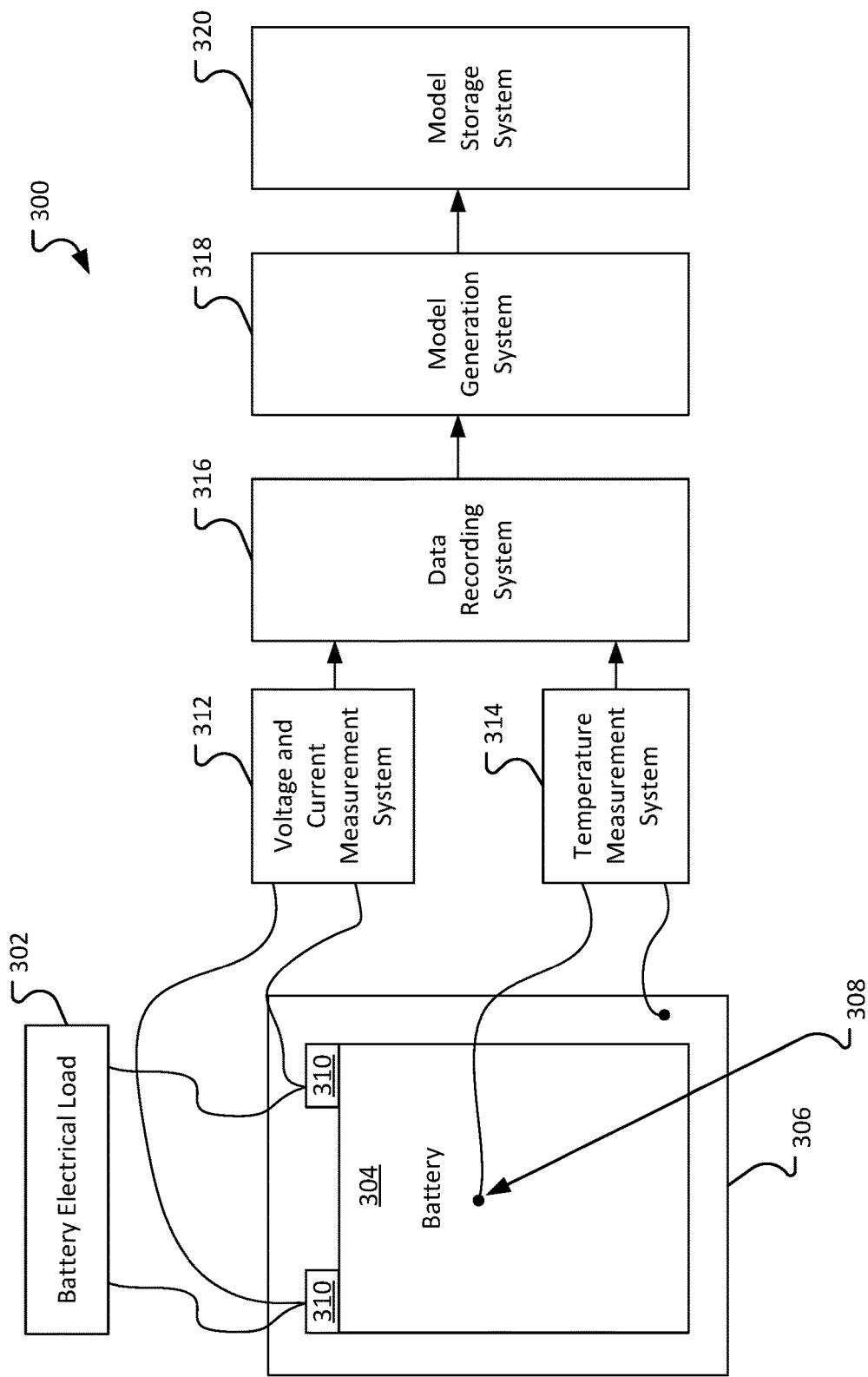
FIG. 3 illustrates an example of a battery data collection system.

FIG. 3 is an example of a battery data collection system 300. The components of the system may be in one location or distributed spatially.

A battery electrical load 302 is a device with generates a time varying signal on the battery causing the voltage and current to vary over time. A battery 304 is the electrochemical device to be characterized. The thermal environment 306 exchanges thermal energy with the battery 304. Its state is measured and known sufficiently to characterize the heat exchange with the battery. The temperature sensing hardware 308 detects temperatures and or heat flows in the battery 304 and the thermal environment 306. The temperature measuring system 314 converts the sensed signals into a form which can be recorded. The voltage and current measurement system 312 converts voltage and current measurements into a form which can be recorded. The electrical data is typically collected at the battery terminals 310. The data recording system 316 stores the measured information from the voltage and current measurement system 312 and the temperature measurement system 314. The model generation system 318 in converts the data recorded in the data recording system 316 into electrical parameters which are provided to the model storage system 320. The model generation system 318 is described in depth below.

In some implementations, this type of system includes laboratory setups and embedded setups. Examples of embedded setups include stationary systems such as uninterruptible power supplies and mobile applications such as vehicles or cell phones. This system may also be applied to generation of models for numerical simulation and analysis.

Figure 4:
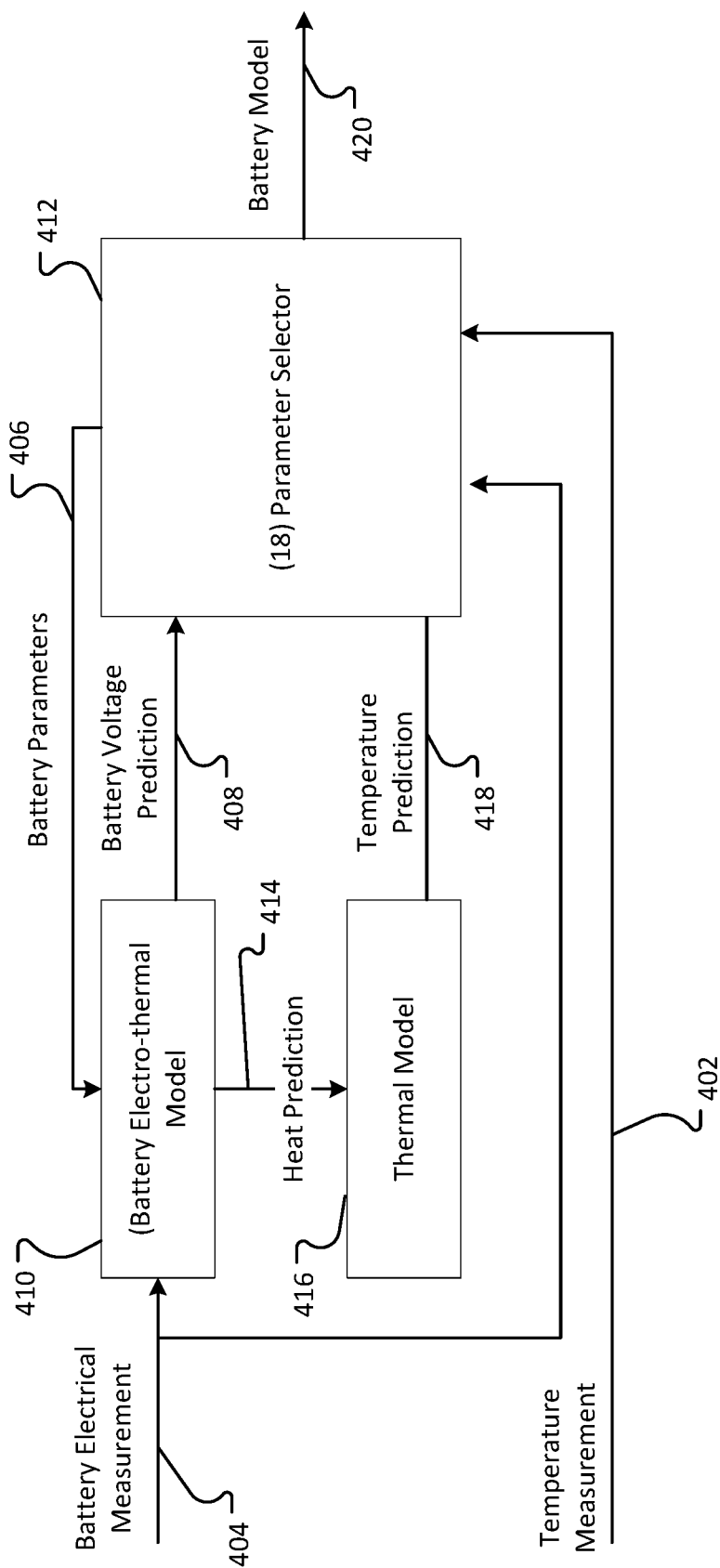
FIG. 4 illustrates an example of a model generation system.

The model generation system 318 incorporates a battery electro-thermal model which is convex with respect to a majority of parameters, a thermal model which predicts temperatures, and a method to select the best set of parameters for the electrical model. This system is illustrated in FIG. 4. The data recording system (316 of FIG. 3) provides (20) temperature data 402 and electrical data 404. This system generates battery parameter values 406 for a battery model consisting of parameters which are identified as convex and non-convex. The convex parameters satisfy the properties of convexity with respect to differences between the electrical measurements 404 and battery voltage predictions 408. Additionally, the convex parameters satisfy the properties of convexity with respect to the differences between the thermal measurements 402 and the battery temperature predictions 418.

The battery electro-thermal model 410 satisfies the following properties. It has convex and non-convex battery parameters 406 which are assigned from the parameter value selector 412. Additionally, the battery parameter values 406 contain initial conditions for the battery models. The electrical model 410 generates a voltage prediction 408 and a heat prediction 414. Finally, the parameter values include initial conditions. The battery parameter values 406 are also capable of defining the battery model for combinations of temperature, SOC, and aging.

An implementations for this model is realized by the equations:

$$\dot{x}_1(t) = \frac{-1}{\varphi_{\tau 1}(S(t)) \cdot w\tau_1} \cdot x_1(t) + \frac{1}{\varphi_{\tau 1}(S(t)) \cdot w\tau_1} \cdot i(t) \quad \text{Eq. 1}$$

$$\dot{x}_2(t) = \frac{-1}{\varphi_{\tau 2}(S(t)) \cdot w\tau_1} \cdot x_2(t) + \frac{1}{\varphi_{\tau 2}(S(t)) \cdot w\tau_2} \cdot i(t) \quad \text{Eq. 2}$$

$$V_{OC}(t) = \varphi_{V_{OC}}(S(t)) \cdot wV_{OC} \quad \text{Eq. 3}$$

$$V(t) = V_{OC}(t) + i(t) \cdot \varphi_{R0}(S(t)) \cdot wR_0 + \quad \text{Eq. 4}$$
$$x_1(t) \cdot \varphi_{R1}(S(t)) \cdot wR_1 + x_2(t) \cdot \varphi_{R2}(S(t)) \cdot wR_2$$

$$q(t) = \quad \text{Eq. 5}$$
$$i^2(t) \cdot \varphi_{R0}(S(t)) \cdot wR_0 + (x_1)^2 \cdot \varphi_{R1}(S(t)) \cdot wR_1 + (x_2)^2 \cdot \varphi_{R2}(S(t)) \cdot wR_2$$

The equations in EQ. 1 through EQ. 5 simulate the electrical and thermal heat generation by battery. The equations correspond to the electrical circuit shown in FIG. 2. This model is illustrated using differential equations. In these equations, the symbol t represents time. The symbol i(t) used in EQ. 1, EQ. 2, EQ. 4, and EQ. 5 is the current measurement contained in the battery electrical measurements 404. The symbol V(t) calculated in EQ. 4 is the predicted voltage 408 and is an output from the battery electro-thermal model 410. The symbol q(t) is the heat generated with the battery and is heat generation output 414. The symbol S(t) represents the state of the battery at a given instant and is some combination of battery temperature, SOC, and age at a given instant in time. The symbols in EQ. 1-5 are the convex and non-convex parameters in the model which are generally vectors. EQ. 1-4 describe the electrical behavior of the battery. EQ. 5 describes the heat generation by the battery. The initial values for this model are contained in the parameters as the values of $x_1(0)$ and $x_2(0)$.

So that the parameters in Table 1 (below) describe the operation of the battery at all states of operation represented by S(t), the vector of values is multiplied by a basis vector function represented by the symbol φ(S). This basis vector function return a basis function for a given value of S. A simple example of a basis vector function is a function where each element in the basis vector corresponds to a specific value of S. For a given value of S, the element of the vector which is closest to S is assigned a value of one while all other elements are assigned a value of zero. In this particular basis, the nearest-neighbor to S is set to a value of one. Many functions satisfy this property and can provide an appropriate basis.

The remaining symbols in Eq. 1 through Eq. 5 are intermediate values used in the calculation of values in Eq. 4 and Eq. 5.

TABLE 1

Parameters in Battery Electrical Model

| Model parameter | Symbol | Convexity |
| --- | --- | --- |
| Open circuit voltage | $wV_{OC}$ | Convex |
| Resistance for positive current | $wR_0$ | Convex |
| Time constant #1 | $w\tau_1$ | Non-Convex |
| DC gain #1 | $wR_1$ | Convex |
| Time constant #2 | $w\tau_2$ | Non-Convex |
| DC gain #2 | $wR_2$ | Convex |
| Initial time constant value 1 | $x_1(0)$ | Non-Convex |
| Initial time constant value 2 | $x_2(0)$ | Non-Convex |

The thermal model 416 provides a prediction of one or more temperatures which are observed in, on, or around the battery given the heat generation by the battery and boundary conditions for its thermal environment (206 of FIG. 2). This model may be realized in many ways. An exemplary thermal model is shown in Eq. 6 In this model, the heat generation 414 input from the battery electro thermal model 410 is represented by q(t). The parameters for this model are shown in Table 2.

$$\dot{T}(t) = q(t) - h \cdot (T(t) - T_{ext}(t)) \quad \text{Eq. 6}$$

TABLE 2

Parameters in the Battery Electrical Model

| Model parameter | Symbol |
| --- | --- |
| Initial Temperature | T(0) |
| Heat transfer | h |
| Boundary Conditions | $T_{ext}(t)$ |

The parameter value selector 412 compared the electrical 404 and thermal 402 measurements with the predicted battery voltage 408 and temperatures 418. Using this difference and the structure of the model equations, the selector will find the best convex parameter values for each non-convex parameter value set evaluated. The best parameters are found which minimize a cost function that maps the electrical and thermal errors to a scalar value.

For example, a simple battery electro-thermal model can include of an open circuit voltage with a resistor. This model is equivalent to a simple resistive electrical circuit. The equations for this model are shown below.

$$V = V_{oc} + I \cdot R$$

$$Q = I^2 \cdot R$$

In these equations, V is the voltage at the terminal, $V_{oc}$ is the open circuit voltage, I is the current, R is the resistance, and Q is the heat generated. This model lacks sensitivity to temperature and state of charge (SOC). To address this, the open circuit voltage and resistance is represented by functions of temperature and SOC, creating a new system of equations for the model.

$$V = V_{oc}(T, SOC) + I \cdot R(T, SOC)$$

$$Q = I^2 \cdot R(T, SOC)$$

The variable T represents the temperature and SOC represents the state of charge. This type of model is usually tuned to match test data by representing the temperature and SOC with tables. The table's entries are selected by performing tests at different temperatures and SOC and choosing entries to best match the test results for each condition independently.

This system of equations is convex for changes in $V_{oc}$ and R. When $V_{oc}(T,SOC)$ and $R(T,SOC)$ are represented by weighted sums of linear basis functions, then the resulting model is convex with respect to the parameters to be fit.

This simple resistive circuit model can be expanded to include addition circuit elements and functional behaviors. For example, the following differential equation is equivalent to an electrical circuit with an RC circuit in series with the previous model.

$$dV_{RC}/dt = -V_{RC}/(R_1(T,SOC) \cdot C_1(T,SOC)) + I/C_1$$

$$V = V_{rc} + V_{oc}(T,SOC) + I \cdot R(T,SOC)$$

$$Q = I^2 \cdot R(T,SOC) + V_{RC}^2(T,SOC)/R_1(T,SOC)$$

In this model, the value of the parameters R, $V_{oc}$, $R_1$, and $C_1$ can be selected by measuring battery operation about a give temperature and SOC, then assigning the results of this data to the resulting parameters. Increasingly complex battery models can be generated by adding additional equations. These additional equations may include effects such as hysteresis and non-linear resistance.

This model is nonconvex with respect to $R_1$, and $C_1$, and convex with respect to R and $V_{oc}$.

Another approach to battery modeling is to generate a model from geometry and physics, expressed in partial differential equations. The equations below illustrate a battery model for a high power lithium ion cell under constant temperature conditions. The ion concentration in this model is a high dimensional equivalent to the SOC. The cell consists of a lithium-carbon (Li—C) electrode, a lithium electrode, an electrolyte region between the two electrodes and a reference a lithium-aluminum (Li—Al) electrode located in the center of the electrolyte region. The cell has a width of $l_1+l_2$ where the Li electrode has 0 width is located at x=0, $l_1$ is the width of the electrolyte region and $l_2$ is the width of the Li—C electrode.

This cell is described via partial differential equations in three dimensions for the electrodes and electrolyte regions in the cell. Boundary conditions are specified for each of these regions. The equations are presented here in Table 3 to illustrate their structure.

TABLE 3

1-D PDE Cell Model

For the electrolyte region:

$$\frac{\partial c}{\partial t} = D \frac{\partial^2 c}{\partial x^2}$$

$$\frac{i}{\varepsilon_e \kappa(c)} = -\frac{\partial \Phi_2}{\partial x} + \frac{\upsilon}{f}(1 - t_+^0)\frac{\partial (\ln(c))}{\partial x}$$

$$\frac{\partial i}{\partial x} = 0$$

For the Li-C electrode region:

$$\frac{\partial c}{\partial t} = D \frac{\partial^2 c}{\partial x^2} + \frac{(1 - t_+^0)}{F}\frac{\partial i_2}{\partial x}$$

TABLE 3-continued

1-D PDE Cell Model $$\frac{i}{\varepsilon_e \kappa(c)} = -\frac{\partial \Phi_2}{\partial x} + \frac{\upsilon}{f}(1 - t_+^0)\frac{\partial (\ln(c))}{\partial x}$$

$$\frac{\partial i}{\partial x} = 0$$

$$\frac{\varepsilon_2}{F}\frac{\partial i_2}{\partial x} = -\varepsilon_1 \sigma \frac{\partial \Phi_1}{\partial x}$$

$$\varepsilon_1 c_s \frac{\partial \Theta_I}{\partial t} = -a_s j_n$$

The Li electrode is assumed to possess trivial dynamics and those are ignored. The boundary conditions are:

$\varepsilon_e F N_+ = i$ at $x = 0$ $\Phi_2 = 0$ at $x = \frac{l_1}{2}$ $$\left. \begin{array}{l} \lim_{x \to l_1^-} \varepsilon_e \frac{\partial c}{\partial x} = \lim_{x \to l_1^+} \varepsilon_2 \frac{\partial c}{\partial x} \\ \lim_{x \to l_1^-} c = \lim_{x \to l_1^+} c \\ \lim_{x \to l_1^-} \Phi_2 = \lim_{x \to l_1^+} \Phi_2 \\ \lim_{x \to l_1^-} i - \lim_{x \to l_1^+} \varepsilon_2 i_2 = 0 \end{array} \right\} \text{ at } x = l_1$$

$$\left. \begin{array}{l} N_+ = 0 \\ i_2 = 0 \\ \Phi_1 = V \\ i - i_{cell} \end{array} \right\} \text{ at } x = l_1 + l_2$$

With the following auxiliary equations:

$$Fj_n = i_{0,ref}\left(\frac{c}{c_{ref}}\right)^{1-\beta}[\Theta_I e^{(1-\beta)f\eta} - (1 - \Theta_I)e^{-\beta f\eta}]$$

$$\eta = \Omega_1 - \Omega_2 - U^\Theta + V_{I-I}(\Theta_I)$$

$$N_+ = -D\frac{\partial c}{\partial x} + \frac{t_+^0}{\varepsilon_e F}i \text{ in electrolyte region}$$

$$N_+ = -D\frac{\partial c}{\partial x} + \frac{t_+^0}{F}i_2 \text{ in Li-C electrode region}$$

$$V_{I-I}(\Theta_I) = a_1 a_2 \frac{(\Theta_I + a_3\Theta_I^2)}{1 + a_1(\Theta_i + a_3\Theta_I^2)}$$

$$\kappa(c) = \kappa_{max} \cdot \left(\frac{m}{m_{max}}\right)^A \exp\left[B(m - m_{max})^2 - A\left(\frac{m - m_{max}}{m_{max}}\right)\right]$$

$$c = \frac{m}{\rho}$$

In this form, the two state variables, c and $\Theta_I$, are elements of the space $C^1[0,l_1+l_2]$ and $C^1[l_1,l_1+l_2]$ respectively. Both are differentiable with respect to t. Fitting this battery model usually involves using known physical properties for the majority of parameters, then using lab experiments to tune remaining parameters for operation at a given temperature. To make tuning and simulation easier, a common technique is to discretize the model in space. This discretization results in the model shown below in Table 4. To arrive at this result, the coefficients in the PDE model are combined and simplified, resulting in new coefficients.

TABLE 4

Figure 5:
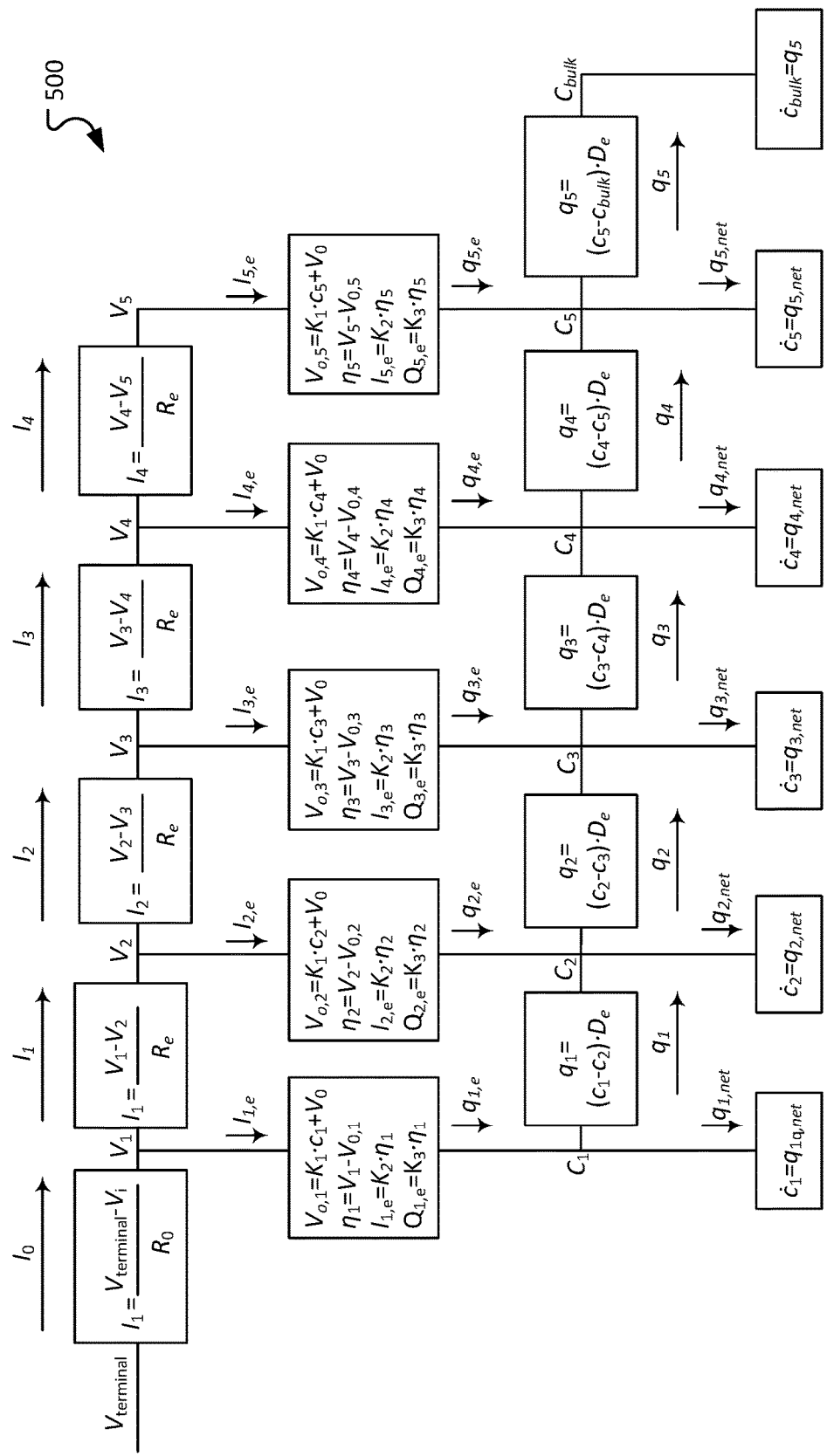
FIG. 5 illustrates a structure of equations for a discretized model.

Discretized 1-D Model $$\frac{d}{dt}\left(\underbrace{\begin{bmatrix} c_2 \\ c_1 \\ \Theta_I \end{bmatrix}}_{=x}\right) = \begin{bmatrix} A_{11}^c & A_{12}^c & 0 \\ A_{21}^c & A_{22}^c & 0 \\ 0 & 0 & 0 \end{bmatrix} \cdot \begin{bmatrix} c_2 \\ c_1 \\ \Theta_I \end{bmatrix} + [0] \cdot \underbrace{[i_{term}]}_{=u} +$$

$$\begin{bmatrix} 0 & 0 \\ B^c & 0 \\ B^\Theta & 0 \end{bmatrix} \cdot \underbrace{\begin{bmatrix} i_{if} \\ \eta \end{bmatrix}}_{=z} + \begin{bmatrix} B^{c_0} \\ 0 \\ 0 \end{bmatrix} \cdot [c_0] = f(x, u, z)$$

$$0 = g\left(\begin{bmatrix} c_2 \\ c_1 \\ \Theta_I \end{bmatrix}, [i_{term}], \begin{bmatrix} i_{if} \\ \eta \end{bmatrix}\right) = g(x, u, z)$$

$$\underbrace{v_{term}}_{=y} = h\left(\begin{bmatrix} c_2 \\ c_1 \\ \Theta_I \end{bmatrix}, [i_{term}], \begin{bmatrix} i_{if} \\ \eta \end{bmatrix}\right) = h(x, u, z)$$

where
$c_1 \in R^{n_1}$ is a vector containing the average electrolyte concentration in the $n_1$ discretized segments in the Li-C electrode.
$\Theta_I \in R^{n_1}$ is a vector containing the average fractional occupancy in the Li-C electrode
$c_2 \in R^{n_2}$ is a vector containing the average electrolyte concentration in the $n_2$ discretized segments in the electrolyte region.
$i_{if} \in R^{n_1}$ is the average current density across the electrochemical interfaces between segments in the electrode region
$\eta \in R^{n_1+1}$ is the potential across the electrochemical interfaces
$x = [c_2^T \; c_1^T \; \Theta_I^T]^T \; R^{2 \cdot n_1 + n_2}$ is the state vector of the system.
$z = [i_{if}^T \; \eta^T]^T \in R^{2 \cdot n_1+1}$ is the vector of algebraic states
$u = [i_{term}] \in R$ is the input vector, the terminal current density
$y = [v_{term}] \in R$ is the output vector, the terminal voltage between the Li-C current collector and the Li-Al reference electrode For this type of problem, separation of convex and non-convex parameters can be challenging. Consider the case of finding parameters for the terminal voltage ($v_{term}$) calculations from above. To help illustrate the structure of the equations, see FIG. 5, for a discretized model 500 of the electrode with five regions. Given knowledge of the concentration (c) at the nodes in the discretized model, then this five node model has $I_0$ and $c_1$ though $c_5$ known. The unknowns are parameters of interest and the variables $v_{term}$, $V_1$, through $V_5$, and $I_1$ through $I_5$. Eleven simultaneous equations are available. If $R_0$ and $R_e$ are parameters to fit, then by solving for their inverse (for example, $1/R_0$), a convex fitting problem is available. However, if resistance is not inverted, then the resulting fit is nonconvex.

Figure 6:
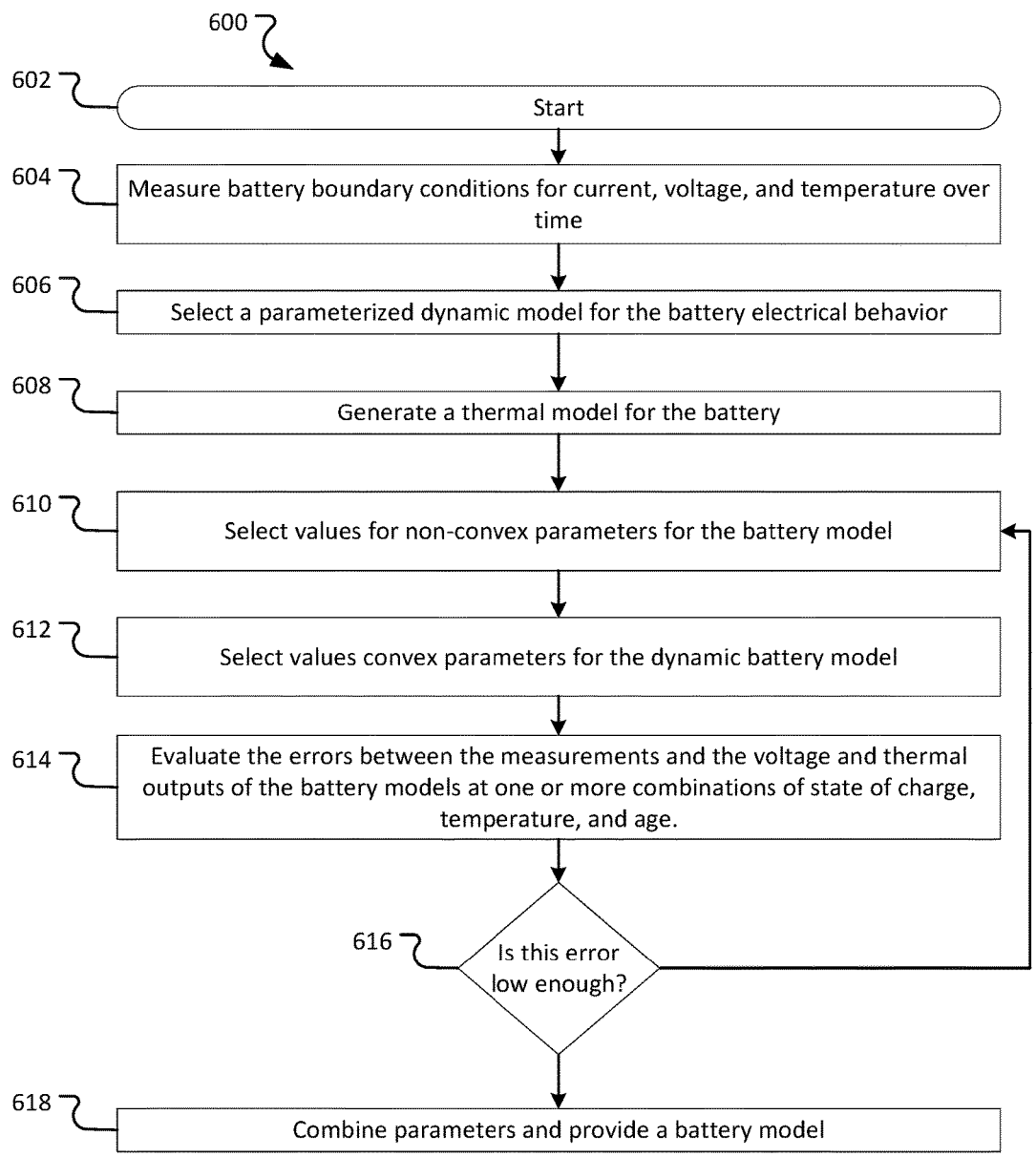
FIG. 6 is a flow chart of an example of a process for fitting a model using test data.

FIG. 6 is a flow chart of an example of a process 600 for fitting a model using test data. After the process 600 starts 602, the process 600 measures 604 battery boundary conditions for current, voltage, and temperature over time. For example, referring to FIG. 3, the battery electrical load 302 and thermal environment 306 establish time varying boundary conditions on the battery 304. In some implementations, battery data can be collected from multiple different batteries and multiple different thermal environments. The battery data can also be collected from multiple different measurement systems. Battery data can also come from other sources including a simulation of battery performance.

Referring back to FIG. 6, the process 600 selects 606 a parameterized dynamic model for the battery electrical behavior. The dynamic model can be a parameterized battery model which can be selected for use in the battery electro-thermal model (for example, the battery electro-thermal model 410 of FIG. 4). The dynamic model can use basis vector functions to represent the parameters over a range of battery states (for example, temperature, state of charge, and age).

The process 600 generate 608 a thermal model for the battery. The model of the (3) battery and its thermal environment can be generated for use in the thermal model. The thermal model may be, for example, the thermal model 416 of FIG. 4.

The process 600 selects 610 values for the non-convex parameters for the battery model. The process also selected 612 selects values for the convex parameters for the dynamic battery model. The parameters may be selected by a model generation system, such as the model generation system 318 of FIG. 3. The values for the parameters can include weights applied to basis functions and intercept adjustments to the basis functions.

The process 600 can perform a search to find the best parameter values for the battery electrical model for a convex cost function of the errors between the predicted voltages and temperatures. This is done by a nested process where the non-convex parameter values are selected (610), and then a convex optimization is performed using the cost function and the convex portion of the battery model to select 612 the convex parameter values. Fitting the non-convex parameter values may trigger fitting of the convex parameter values. In some implementations, selecting non-convex parameters may include an iterative fitting procedure in which different values or functions are fit to the non-convex parameters in a loop.

The process 600 improves the utilization the computer or processor executing it. The processor utilization is improved because the process 600 reduces the processing time required to generate an electro-thermal model. The process 600 by focusing on fitting 600 the fewer non-convex parameters prior to fitting the convex parameters, the process 600 intelligently selects the parameters to use. For example, fitting convex parameters is less cost intensive than fitting non-convex parameters. Accordingly models may be selected that include relatively fewer non-convex parameters. In some implementations, selecting a battery model may include comparing the number of non-convex parameters to a threshold. In some implementations, selecting a battery model may include determining a ratio between the non-convex parameters and the convex parameters. The ratio may then be compared the ratio to a threshold.

The process 600 evaluates 614 the errors between the measurement and the voltage and thermal outputs of the battery models. Generally, the process evaluates the difference between the electro thermal model's predicted results and the measured values are low enough (616) then the parameter values are combined 618 and used to create an electro thermal model.

If the error are not low enough the process 600 returns to select 610 new parameter values.

The fitted electro thermal model can be used to predict battery function over a continuous range of battery operating states. The range of battery operating states may include a subset of the conditions expected to be experienced by the battery during its useful life.

Once an electro thermal model is selected, the model can be encoded or integrated into electronic devices to monitor and predict the performance of the battery. For example, the electro-thermal model can be integrated into an automobile or a mobile electronic device.

Figure 7:
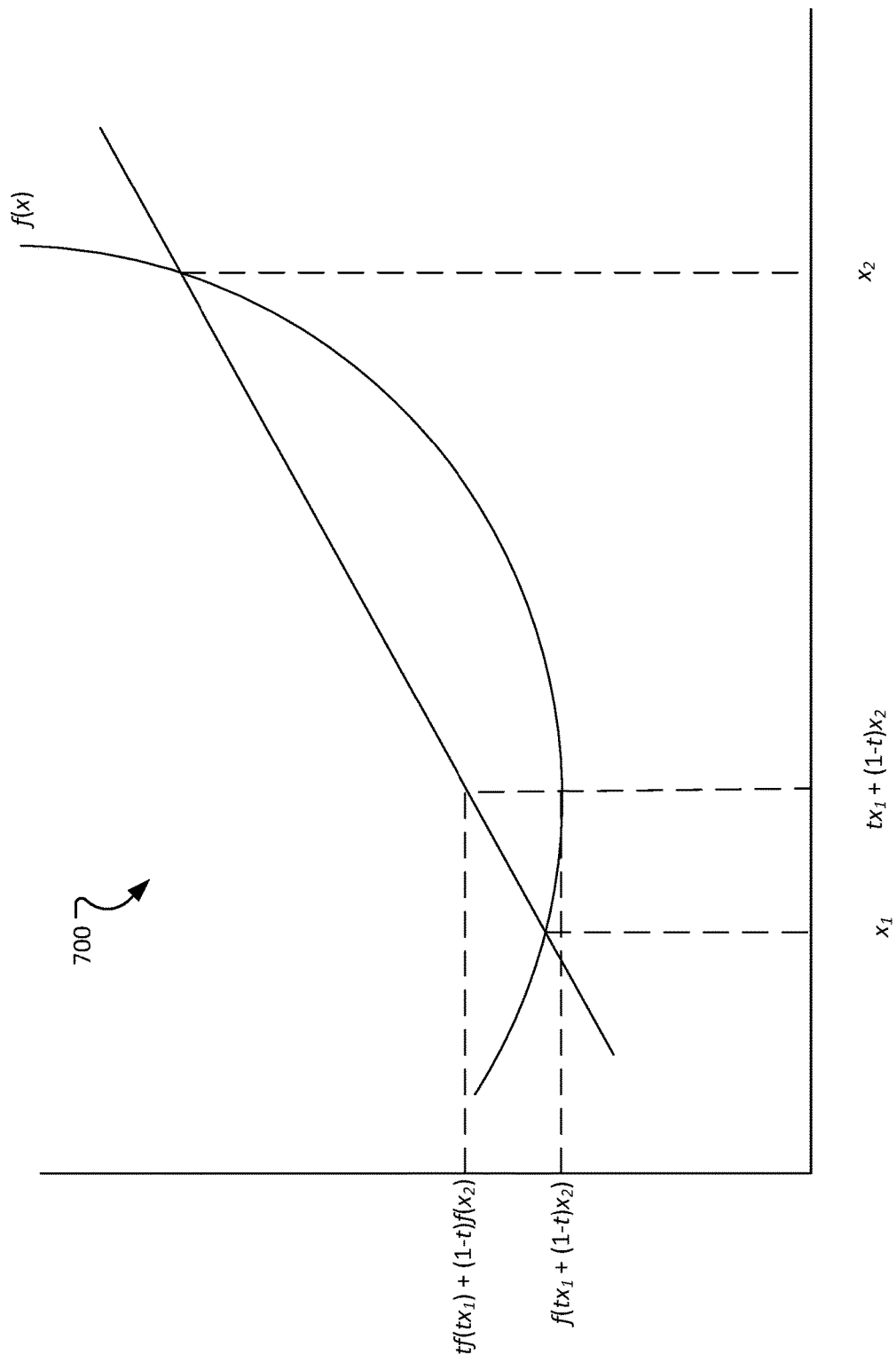
FIG. 7 is a graph that illustrates a convex function.

FIG. 7 is a graph 700 that illustrates a convex function. A function is convex with respect to a variable if along every interval, the value of the function is less than any point along a line between the ends of the interval. Another definition of convexity is if $f(\theta x+(1-\theta)y) \leq \theta f(x)+(1-\theta)f(y)$ for $0 \leq \theta \leq 1$ then the domain of x, y is also convex.

Convexity may be determined by analysis of equation structure. It may also be determined experimentally with a high degree of certainty through evaluation of gradient and sampling.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (also referred to as a data processing program) (i.e., one or more modules of computer program instructions, encoded on computer storage medium for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The subject matter may be implemented on computer program instructions stored on a non-transitory computer storage medium.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example: a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-volatile memory, media and memory devices, including by way of example, semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), or that includes a middleware component (e.g., an application server), or that includes a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprises:
obtaining by a data processing apparatus, battery data comprising voltage values corresponding to operating states of a battery;
selecting by the data processing apparatus, a battery model having convex parameters that exhibit convexity with respect to differences between the battery data and battery data predictions and non-convex parameters;
assigning by the data processing apparatus from a parameter selector, a set of convex and non-convex parameters, by:
fitting the convex parameters to the battery data for fixed values of the non-convex parameters,
fitting the non-convex parameters to the battery data, and
producing an electro-thermal model for the battery from the selected battery model using the fitted values of the convex parameters and the fitted values of the non-convex parameters.

2. The method of claim 1, wherein fitting of the non-convex parameters occurs prior to fitting of the convex parameters; and
fitting of the convex parameters occurs with the non-convex parameter values being determined.

3. The method of claim 2, wherein the fitting the non-convex parameters continues until values of a cost function satisfies a predefined threshold.

4. The method of claim 1, wherein a nested loop procedure is executed in which the convex parameters are fit with respect to the battery data using an inner loop during which the non-convex parameters are held fixed, and the non-convex parameters are fit with respect to the battery data using an outer loop.

5. The method of claim 1, wherein obtaining battery data further comprises:
obtaining, by the data processing apparatus, temperature values corresponding to operating states of the battery; and the battery model includes an electrical model and a thermal model, with the electrical model configured to predict battery voltage and heat generation, and the thermal model configured to predict temperature based on the heat generation, with a difference between a predicted temperature and the temperature values is an input to assigning the set of convex and non-convex parameters.

6. The method of claim 1, wherein the battery model uses basis vector functions to represent the at least one convex parameter over a range of battery states and the battery state includes at least one of battery temperature, state of charge, and age.

7. The method of claim 5, wherein difference between the predicted temperature and the temperature data is included in a cost function used in assigning the set of convex and non-convex parameters.

8. The method of claim 1, wherein the battery data is collected from multiple, different batteries.

9. The method of claim 1, where the battery data is collected from a plurality of thermal environments.

10. The method of claim 1, wherein the battery data is collected from multiple measurement systems.

11. The method of claim 1, further comprising encoding the electro-thermal model in electronics to monitor battery performance in an automobile.

12. The method of claim 1, further comprises encoding the electro-thermal model in electronics to monitor battery performance in a mobile electronic device.

13. The method of claim 1, further comprising a simulation system configured to execute a numerical simulation of a battery.

14. The method of claim 1, wherein selecting the battery model comprises comparing a plurality of battery models and selecting the battery model having the lowest cost function.

15. The method of claim 1, wherein the at least one convex parameter is selected based on a convex cost function.

16. The method of claim 1, wherein selecting the battery model comprises comparing determined non-convex parameters to a threshold.

17. The method of claim 1, wherein selecting the battery model comprises:

determining a ratio between the non-convex parameters and the convex parameters; and comparing the determined ratio to a threshold.

18. The method of claim 1, wherein the electro-thermal model is predictive over a continuous range of battery operating states.

19. The method of claim 2, wherein the fitting enables efficient processor use by selecting the non-convex parameters prior to selecting the convex parameters.

20. The method of claim 1, wherein the operating state of the battery comprises at least one of temperature, electrical current, and state of charge.

21. A system comprises:
a processor and a memory operatively coupled to the processor, with the processor and memory being configured to execute instructions to:
obtain battery data comprising voltage values corresponding to operating states of a battery;
select a battery model, the battery model having convex parameters that exhibit convexity with respect to differences between the battery data and battery data predictions and non-convex parameters;
assign from a parameter selector, a set of convex and non-convex parameters, by instructions to:
fit the convex parameters to the battery data for fixed values of the non-convex parameters, and
fit the non-convex parameters to the battery data, and
produce an electro-thermal model for the battery from the selected battery model using the fitted values of the convex parameters and the fitted values of the non-convex parameters.

22. A non-transitory computer-readable data storage medium storing computer-executable instructions for simulating fluid flow and acoustic interaction of a fluid with a porous medium that, when executed cause a computer to:
obtain battery data comprising voltage values corresponding to operating states of a battery;
select a battery model, the battery model having convex parameters that exhibit convexity with respect to differences between the battery data and battery data predictions and non-convex parameters;
assign from a parameter selector, a set of convex and non-convex parameters, by instructions to:
fit the convex parameters to the battery data for fixed values of the non-convex parameters,
fit the non-convex parameters to the battery data, and
produce an electro-thermal model for the battery from the selected battery model using the fitted values of the convex parameters and the fitted values of the non-convex parameters.

* * * * *